April 28, 1931.  H. J. WILKINS  1,803,046
TIRE GAUGE HOLDER
Filed April 4, 1928
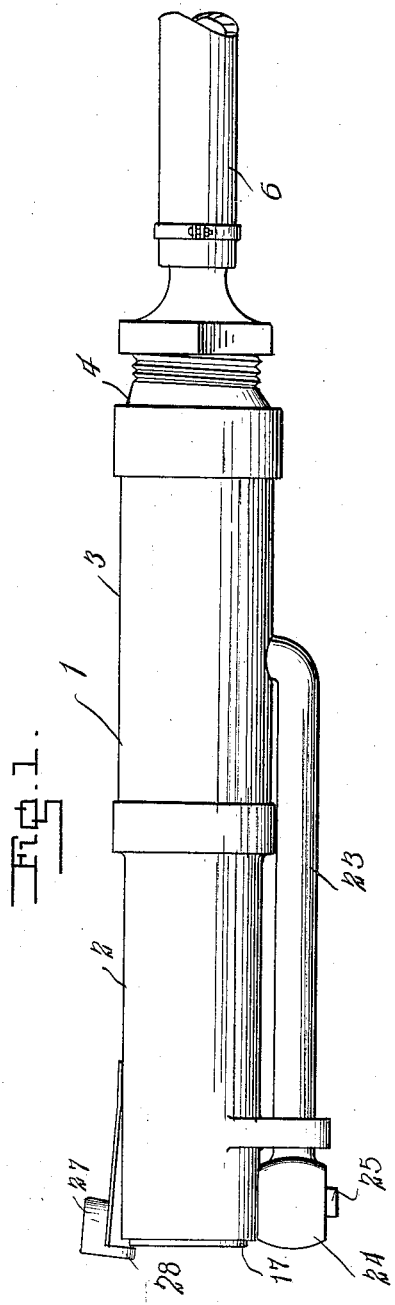
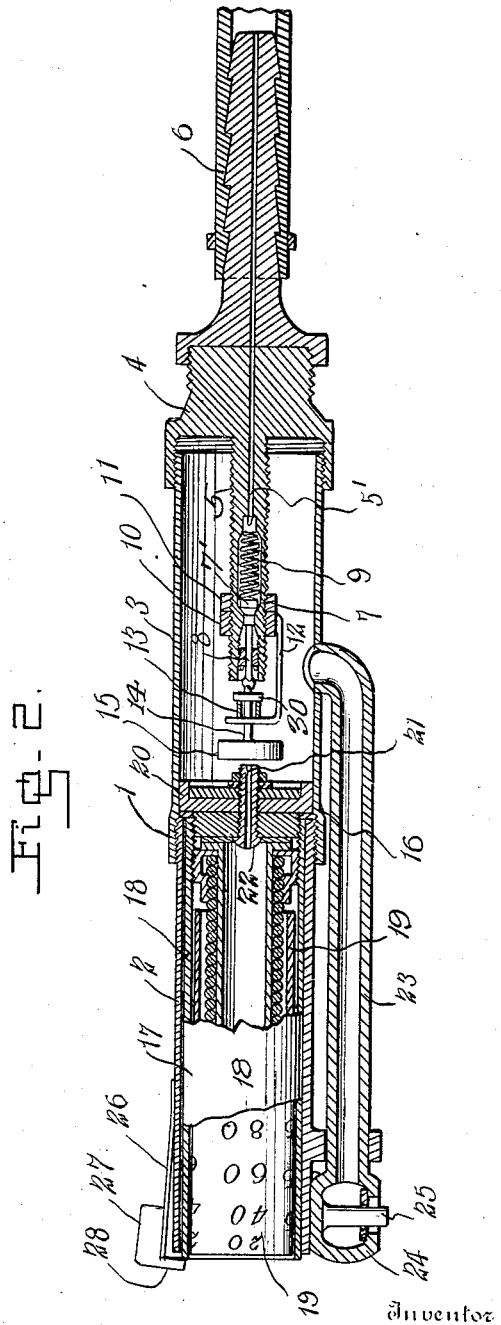
Inventor
H.J.Wilkins
By Lacey & Lacey, Attorneys Patented Apr. 28, 1931

1,803,046

UNITED STATES PATENT OFFICE

HERBERT J. WILKINS, OF GORDONSVILLE, VIRGINIA

TIRE-GAUGE HOLDER

Application filed April 4, 1928. Serial No. 267,318.

The present invention is directed to improvements in holders for tire pressure gauges.

The primary object of the invention is to provide a device of this character in which a tire gauge can be placed and maintained in such position that the same can be conveniently used, yet can not be removed from the holder.

A further object of the invention is to provide a device of this character so constructed that it will form a part of the supply hose in order to prevent patrons of filling stations or garages taking the gauge.

It frequently occurs that a patron of a filling station will borrow the tire gauge from an attendant and after inflating the tires will thoughtlessly carry the gauge away, which entails quite a loss to filling stations, and it is to overcome this objection that the holder has been perfected.

While the drawing illustrates a preferred embodiment of the invention it is to be understood that in adapting the means to meet specific needs and requirements the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which, Figure 1 is a side elevation of the device.

Figure 2 is a longitudinal sectional view.

Corresponding and like parts are referred to in the following description and designated in the views of the drawing by like reference characters.

The holder 1 comprises tubular sections 2 and 3, the section 3 being closed at one end by a head 4, said head carrying a threaded stem 5 which projects into the section 3 and has an air passage 5' therein in order that air from the hose 6 may pass into the stem. The stem has formed therein a valve seat 7 and cooperating with said seat is a valve 7', the stem 8 of which projects slightly beyond the inner end of the stem 5.

This valve is held normally seated by a coil spring 9. Threaded upon the stem 5 is a collar 10 which is maintained in adjusted position by a jam nut 11, said collar having a bracket 12 carried thereby, and mounted in said bracket is a guide 13 in which is slidable a pin 14, the inner end of the pin being adapted to engage the valve stem 8, while the outer end thereof is provided with a disk 15, the purpose of which will be later explained.

The holder section 2 is threaded into the section 3, the meeting end of the latter section being slightly offset, as shown at 16, to permit the flange at the end of the barrel 17 to rest against the end of the section 2. The barrel 17 constitutes the outer casing of the gauge 18 which is of well known form and includes a graduated indicating member 19, the barrel fitting snugly but slidably in the holder section 2.

At the inner end of the gauge is a packing washer 20 in order that an air tight joint may be maintained within the holder section 3, the gauge being in communication with the section 3 through the nipple 21 in which an axial passage 22 is formed so that air passing therethrough will actuate the indicator member 19. It will be observed that the nipple 21 is so positioned that when the barrel is moved rearwardly the inner end of the nipple will engage the disk 15 to slide the pin 14 in a direction to actuate the stem 8 which unseats the valve 7' in order that air may pass from the stem 5 into the section 3 through the inner end of the stem 5, the valve stem 8 being supported by a grooved or ported guide in a very well-known manner.

A discharge tube 23 is provided and has its inner end opening into the section 3, while the outer end thereof carries a hollow head 24 from which extends a pin 25 adapted to engage the usual tire inflation valve when said hollow head is pressed thereon.

A leaf spring 26 has its inner end fixed to the section 2, while the outer end thereof carries a button 27 provided with a catch 28, said catch being adapted to lie in front of the section 2 to prevent premature outward movement of the indicator member 19.

It will be obvious that, owing to the presence of the spring 26, the catch 28 will be normally positioned so that the member 19 can have free outward movement, but when the button 27 is pressed the latch 28 will be moved in front of the member 19 to prevent the same from moving outwardly until the button is released.

Briefly, the operation is as follows:

The holder is grasped and the thumb placed upon the button 27 in order that the catch 28 will be in a position to prevent outward movement of the indicator member 19, and the forefinger is then placed upon the outer end of said member and the gauge barrel so that, if pressure be exerted by the forefinger, the barrel will slide inwardly and cause the nipple 21 to engage and push the disk 15, thus causing the pin 14 to unseat the valve 7', whereupon air entering the section 3 will pass through the tube 23 and head 24 into the tire valve. Air is permitted to flow into the tire until it is desired to obtain a reading, whereupon the button 27 is released and the forefinger removed from the member 19 whereupon the pressure built up in the tire will back up into the section 3, and against the washer 20 to slide the washer and gauge forward. The valve 7', the disk 15 and the intermediate parts will follow the movement of the washer under the influence of the spring 9 and the air pressure on the disk until the stop 30 on the pin 14 impinges against the guide 13, whereupon the washer will move forward from the disk under the air pressure. The nipple will be freed from the disk, as shown in Fig. 2, and the compressed air will flow into the gauge to operate the same in the usual manner. It will be noted that the gauge is slidable as an entirety in the holder and operates as a piston to open the valve 7', the outward movement of the gauge barrel 17 being limited by the flange thereon engaging the inner end of the section 2 of the holder. If the reading is not correct or the tire is underinflated the gauge is again forced back in the tubular body to unseat the valve 7' and permit an additional supply of air to flow into the tire.

I have illustrated the tube 23 as being a rigid part of the holder, but by minor changes a short length of rubber hose may be substituted therefor in order that the device may be more conveniently used when inflating tires upon disk wheels.

A holder of the class described will permit tires to be inflated and the pressure registered in a much shorter time than now required.

Having thus described the invention, I claim:

A holder comprising a tubular body having an inlet and an outlet for air under pressure, a pressure gauge slidably housed in the body, a valve for controlling the flow through the inlet, yieldable means for holding the valve normally closed, a bracket within the tubular body, a pin slidably supported by the bracket and arranged to engage the valve for opening the same, a tube leading from the outlet for conducting air to a tire valve, and a nipple carried by the gauge and alined axially with the pin whereby inward movement of the gauge and nipple will actuate the pin for opening the valve.

In testimony whereof I affix my signature.

HERBERT J. WILKINS. [L. S.]